United States Patent
Lee et al.

(10) Patent No.: US 9,357,560 B2
(45) Date of Patent: May 31, 2016

(54) METHOD AND APPARATUS FOR UPDATING TRACKING AREA IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/407,912

(22) PCT Filed: Jul. 22, 2013

(86) PCT No.: PCT/KR2013/006531
§ 371 (c)(1),
(2) Date: Dec. 12, 2014

(87) PCT Pub. No.: WO2014/014324
PCT Pub. Date: Jan. 23, 2014

(65) Prior Publication Data
US 2015/0156743 A1    Jun. 4, 2015

Related U.S. Application Data

(60) Provisional application No. 61/673,739, filed on Jul. 20, 2012.

(51) Int. Cl.
| | |
|---|---|
| *H04W 76/04* | (2009.01) |
| *H04W 72/14* | (2009.01) |
| *H04W 36/00* | (2009.01) |
| *H04W 8/00* | (2009.01) |
| *H04W 60/04* | (2009.01) |
| *H04W 68/02* | (2009.01) |
| *H04W 8/14* | (2009.01) |
| *H04W 76/02* | (2009.01) |
| *H04W 8/24* | (2009.01) |

(Continued)

(52) U.S. Cl.
CPC .............. *H04W 72/14* (2013.01); *H04W 8/005* (2013.01); *H04W 8/14* (2013.01); *H04W 8/24* (2013.01);

(58) Field of Classification Search
CPC ....... H04W 60/02; H04W 60/04; H04W 8/04; H04W 8/06; H04W 8/005; H04W 76/043; H04W 76/045; H04W 6/00; H04W 6/02; H04W 6/06
USPC .............................................. 455/426.1, 422.1
See application file for complete search history.

(56) References Cited

U.S. PATENT DOCUMENTS

2012/0100803 A1* 4/2012 Suum ................ H04W 36/0072
455/41.1

(Continued)

FOREIGN PATENT DOCUMENTS

| EP | 2369883 | 9/2011 |
|---|---|---|
| EP | 2651153 | 10/2013 |

(Continued)

OTHER PUBLICATIONS

Huawei, et al., "RAN enhancements for MTC," 3GPP TSG-RAN WG2 Meeting #69bis, R2-102195, Apr. 2010, 7 pages.

(Continued)

*Primary Examiner* — Siu Lee
(74) *Attorney, Agent, or Firm* — Lee Hong Degerman Kang & Waimey; Jonathan Kang; Jeffrey Lotspeich

(57) ABSTRACT

A method and apparatus for updating a tracking area for a device-to-device (D2D) connection in a wireless communication system is provided. A second mobile device receives a tracking area update (TAU) request message from a first mobile device which has a D2D connection with the second mobile device, and transmits a TAU message to a network.

11 Claims, 10 Drawing Sheets

(51) Int. Cl.
  *H04W 24/08* (2009.01)
  *H04W 72/04* (2009.01)
  *H04W 88/06* (2009.01)
  *H04W 24/10* (2009.01)
  *H04W 92/18* (2009.01)

(52) U.S. Cl.
  CPC .......... *H04W 24/08* (2013.01); *H04W 36/0061* (2013.01); *H04W 60/04* (2013.01); *H04W 68/02* (2013.01); *H04W 72/042* (2013.01); *H04W 76/023* (2013.01); *H04W 76/027* (2013.01); *H04W 76/043* (2013.01); *H04W 76/046* (2013.01); *H04W 76/048* (2013.01); *H04W 24/10* (2013.01); *H04W 76/021* (2013.01); *H04W 88/06* (2013.01); *H04W 92/18* (2013.01)

(56) References Cited

U.S. PATENT DOCUMENTS

| | | | |
|---|---|---|---|
| 2012/0142371 A1 | 6/2012 | Park et al. | |
| 2012/0214493 A1* | 8/2012 | Suh | H04W 36/0066 455/437 |
| 2013/0109301 A1* | 5/2013 | Hakola | H04W 76/023 455/39 |
| 2014/0036873 A1* | 2/2014 | Cheng | H04W 36/0022 370/331 |
| 2014/0120907 A1* | 5/2014 | Yu | H04W 76/023 455/426.1 |

FOREIGN PATENT DOCUMENTS

| | | |
|---|---|---|
| GB | 2496153 | 5/2013 |
| WO | 2011/043571 | 4/2011 |
| WO | 2011/082538 | 7/2011 |
| WO | 2012/147270 | 11/2012 |

OTHER PUBLICATIONS

Taleb, et al., Machine Type Communications in 3GPP Networks: Potential, Challenges, and Solutions, IEEE Communications Magazine, Mar. 2012, pp. 178-184.

PCT International Application No. PCT/KR2013/006531, Written Opinion of the International Searching Authority dated Oct. 28, 2013, 1 page.

European Patent Office Application Serial No. 13820634.7, Search Report dated Mar. 1, 2016, 7 pages.

* cited by examiner

METHOD AND APPARATUS FOR UPDATING TRACKING AREA IN WIRELESS COMMUNICATION SYSTEM

CROSS-REFERENCE TO RELATED APPLICATIONS

This application is the National Stage filing under 35 U.S.C. 371 of International Application No. PCT/KR2013/006531, filed on Jul. 22, 2013, which claims the benefit of U.S. Provisional Application Ser. No. 61/673,739, filed on Jul. 20, 2012, the contents of which are hereby incorporated by reference herein in their entirety.

BACKGROUND OF THE INVENTION

1. Field of the Invention

The present invention relates to wireless communications, and more particularly, to a method and apparatus for updating a tracking area in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

With the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

How a network and UEs should operate for D2D connection should be specified.

SUMMARY OF THE INVENTION

The present invention provides a method and apparatus for updating a tracking area for device-to-device (D2D0 connection in a wireless communication system. The present invention provides a method for tracking area update of a second mobile device due to a tracking area update of a first mobile device when the first mobile device and the second mobile device are connected by D2D connection.

In an aspect, a method for updating, by a second mobile device, a tracking area for a device-to-device (D2D) connection in a wireless communication system is provided. The method includes receiving a tracking area update (TAU) request message from a first mobile device which has a D2D connection with the second mobile device, and transmitting a TAU message to a network.

The TAU request message may include a tracking area code and an identity of the first mobile device.

The TAU message may include an identity of the first mobile device and a D2D connection indication which informs the network that the second mobile device is connected to the network via the D2D connection.

The TAU message may include information on the second mobile device.

The information on the second mobile device may be an identity of the second mobile device.

The TAU message may be transmitted to a mobility management entity (MME) via the first mobile device and a serving eNodeB (eNB).

The TAU message may be transmitted to a serving eNB directly.

The method may further include receiving a D2D paging message from the network, and transmitting a paging response message to the network.

The paging response message may include an identity of the second mobile device and a D2D connection indication which informs the network that the second mobile device is connected to the network via the D2D connection.

In another aspect, a method for updating, by a first mobile device, a tracking area for a device-to-device (D2D) connection in a wireless communication system is provided. The method includes transmitting a tracking area update (TAU) request message, to a second mobile device which has a D2D connection with the first mobile device, due to TAU of the first mobile device.

Tracking area update for D2D connection can be supported efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
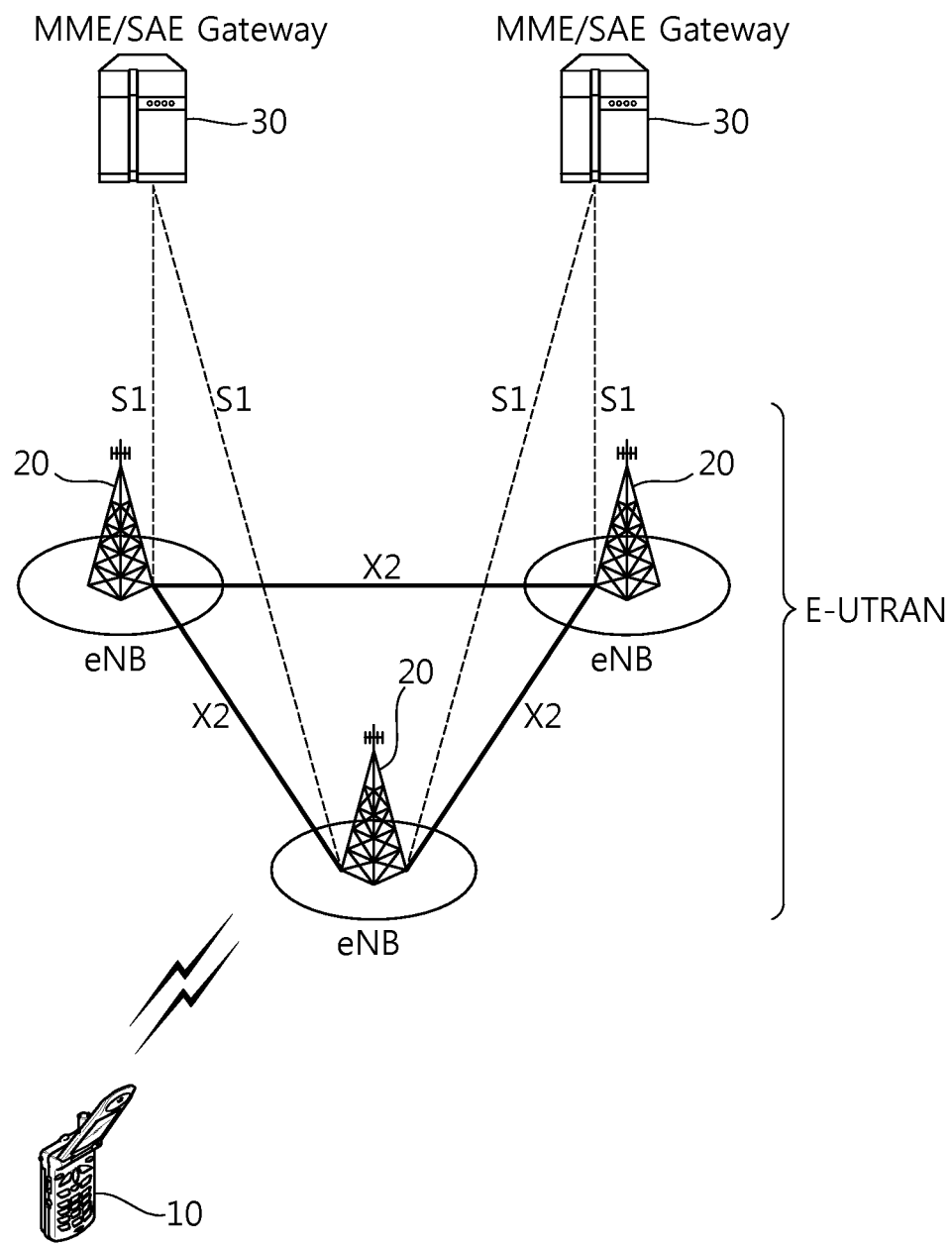
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
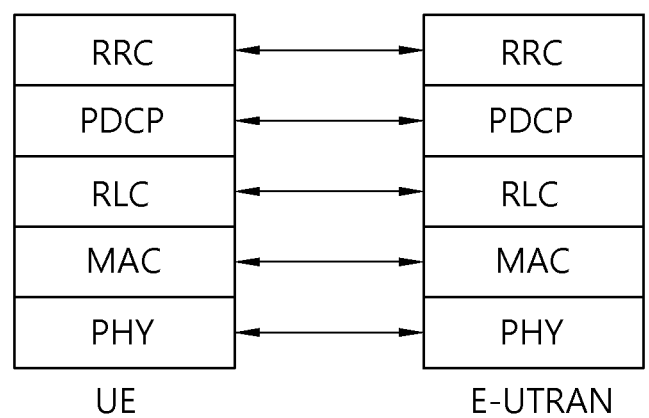
FIG. 2 is a diagram showing radio interface protocol architecture for a control plane.
Figure 3:
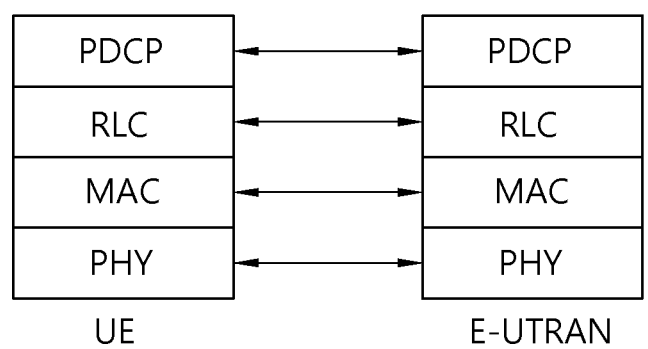
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
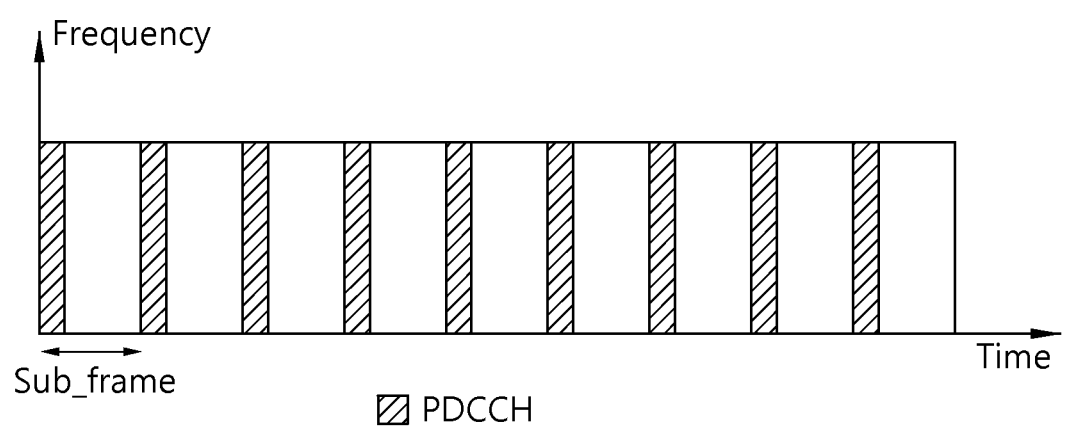
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A radio resource state (RRC) state indicates whether an RRC of a user equipment (UE) is logically connected to an RRC of a network. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED has the RRC connection established with the network, the network can recognize the existence of the UE in the RRC_CONNECTED and can effectively control the UE. Meanwhile, the UE in the RRC_IDLE cannot be recognized by the network, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the network through an RRC connection procedure and then may transition to the RRC_CONNECTED. The UE which remains in the RRC_IDLE may need to establish the RRC connection with the network when uplink data transmission is necessary due to a user's call attempt or the like or when there is a need to transmit a response message upon receiving a paging message from the network.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED. To access the network, the UE may perform a process of registering to the network through an initial attach procedure. If the initial attach procedure is successfully performed, the UE and the MME may be in the EMM-REGISTERED.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE establishes an RRC connection with the E-UTRAN, the UE may be in the ECM-CONNECTED. When the MME in the ECM-IDLE establishes an S1 connection with the E-UTRAN, the MME may be in the ECM-CONNECTED. When the UE is in the ECM-IDLE, the E-UTRAN does not have information on the context of the UE. Therefore, the UE in the ECM-IDLE can perform a UE-based mobility related procedure such as cell selection or cell reselection without having to receive a command of the network. If a location of the UE in the ECM-IDLE becomes different from a location known to the network, the UE may report the location of the UE to the network through a tracking area update procedure. On the other hand, the mobility of the UE in the ECM-CONNECTED may be managed by the command of the network.

Figure 5:
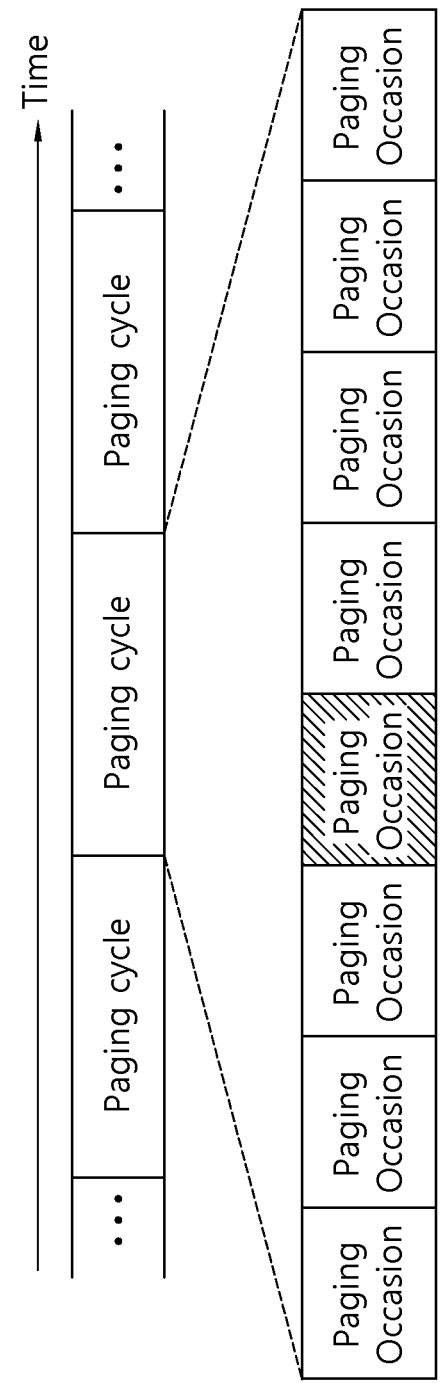
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

The system information is necessary information which must be known to the UE to access the network. The UE must entirely receive the system information before the network access, and must always have the latest system information. In addition, since the system information is information which must be known to all UEs in one cell, the BS may periodically transmit the system information.

The system information may include a master information block (MIB), a scheduling block (SB), a system information block (SIB), etc. The MIB may indicate a physical configuration (e.g., a bandwidth, etc.) of a corresponding cell. The SB may indicate transmission information of SIBs, for example, a transmission period of the SIBs. The SIB is a set of related system information. For example, a certain SIB may include only information of a neighbor cell, and another SIB may include only information of an uplink radio channel used by the UE.

The BS may transmit the paging message to the UE to report whether there is a change in the system information. In this case, the paging message may include a system information change indicator. If the paging message received according to the paging cycle includes the system information change indicator, the UE may receive the system information transmitted through a BCCH which is a logical channel.

Figure 6:
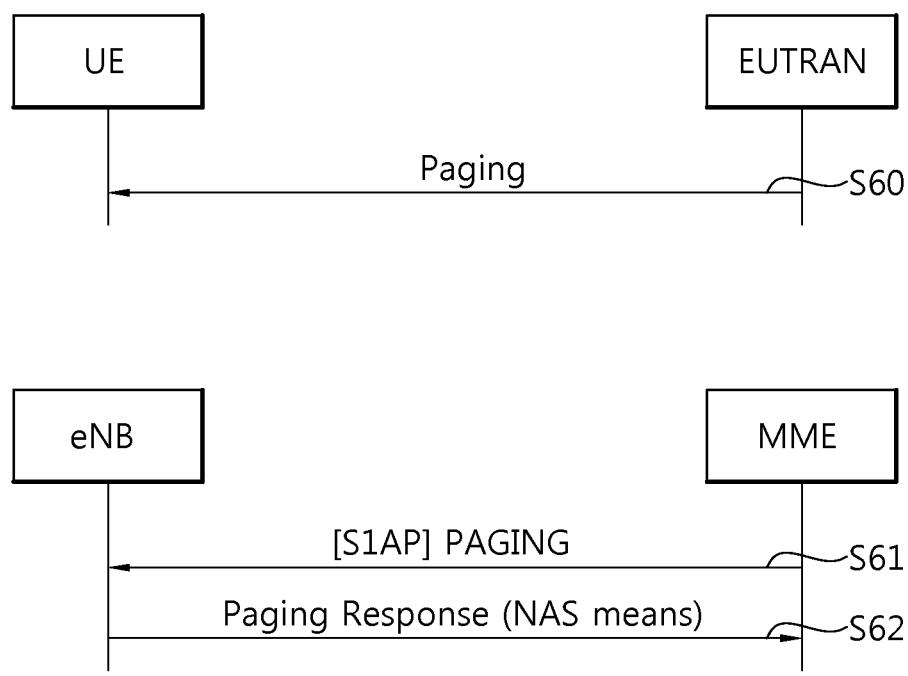
FIG. 6 shows a paging procedure.

FIG. 6 shows a paging procedure. It may be referred to Section 5.3.2 of 3GPP TS 36.331 V10.5.0 (2012-03). The purpose of this procedure is to transmit paging information to a UE in RRC_IDLE and/or, to inform UEs in RRC_IDLE and UEs in RRC_CONNECTED about a system information change and/or, to inform about an earthquake and tsunami warning system (ETWS) primary notification and/or ETWS secondary notification and/or, to inform about a commercial mobile alert system (CMAS) notification. The paging information is provided to upper layers, which in response may initiate RRC connection establishment, e.g. to receive an incoming call.

Further, S1 paging function supports transmitting of paging requests to all cells of tracking area(s) the UE is registered. Paging requests are transmitted to the relevant eNBs according to mobility information kept in UE's MM context in the serving MME. The MME initiates the paging procedure by transmitting a paging message to each eNB with cells belonging to the tracking area(s) in which the UE is registered. Each eNB can contain cells belonging to different tracking areas, whereas each cell can only belong to one tracking area. A paging response back to the MME is initiated on NAS layer and is transmitted by the eNB based on NAS-level routing information.

Referring to FIG. 6, at step S60, the E-UTRAN transmits a paging (Paging) message to the UE. Further, at step S61, the MME transmits a paging message to the eNB. At step S62, the eNB transmits a paging response to the MME.

Mobility management functions are used to keep track of a current location of a UE. For mobility of the UE, a tracking area (TA) may be defined. The location of the UE may be known by a network on a tacking area list granularity. The UE may be paged in all cells of the tracking areas in which it is currently registered. The UE may be registered in multiple tracking areas. All the tracking areas in the tracking area list to which the UE is registered are served by the same serving MME.

Figure 7:
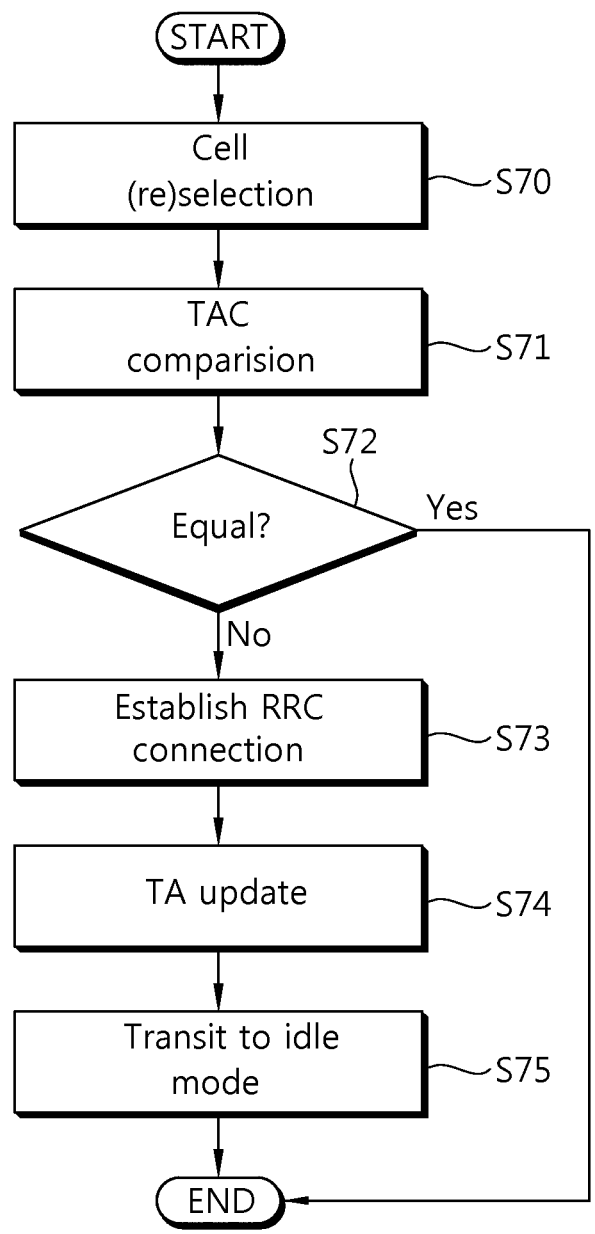
FIG. 7 shows an example of a tracking update procedure.

FIG. 7 shows an example of a tracking update procedure.

At step S70, the UE performs a cell (re)selection. At step S71, after performing the cell (re)selection, the UE compares a current tracking area code (TAC) with a previous TAC.

At step S72, the UE determines whether the current TAC is equal to the previous TAC or not. If the current TAC is equal to the previous TAC, this means that the UE remains at the current tracking area. At this time, the UE does not perform a TA update procedure.

If the current TAC is not equal to the previous TAC, this means that the UE enters a new tracking area. To reduce the cell change reporting overhead from the UE to the MME, the UE establishes an RRC connection at step S73, and at step S74, the UE performs the TA update procedure. Then, at step S75, the UE transits to an idle mode.

Device-to-device (D2D) connection is described below.

The D2D connection is a connection between one master UE (M-UE) and one slave UE (S-UE). That is, the D2D connection is a direct connection between UEs. The M-UE may control the D2D connection with the S-UE autonomously (i.e. UE autonomous mode) or under full/partial control of an E-UTRAN (i.e. E-UTRAN planned mode). One M-UE may configure zero, one or more D2D connections. Different D2D connections may be established with different S-UEs.

The E-UTRAN may configure following two D2D modes in a cell. Only one D2D mode may be configured for a specific cell, for a specific M-UE, for a specific S-UE, or for a specific D2D connection between one M-UE and one S-UE.

1) E-UTRAN planned mode: The E-UTRAN (i.e. eNodeB (eNB) serving the M-UE called 'serving eNB') is responsible for maintaining D2D connection (in terms of radio resource or quality of service (QoS) over D2D connection). The serving eNB has S-UE context for the S-UE connected to the M-UE. A mobility management entity (MME) connected to the serving eNB has S-UE context for the S-UE connected to the M-UE.

2) UE autonomous mode: The M-UE is responsible for maintaining D2D connection (in terms of radio resource or QoS over D2D connection). The serving eNB has no S-UE context for the S-UE connected to the M-UE. The MME connected to the serving eNB may or may not have S-UE context for the S-UE connected to the M-UE.

The S-UE may or may not have an RRC connection with either the serving eNB or another eNB for both modes.

In addition, a D2D hybrid mode may be defined. In the D2D hybrid mode, both the UE autonomous mode and the E-UTRAN planned mode are used for a single D2D connection between one M-UE and one S-UE. Which mode between the UE autonomous and the E-UTRAN planned mode is used for the D2D connection may depend on QoS of D2D radio bearers between the M-UE and the S-UE. For example, a D2D DRB for voice or video service may be established based on the E-UTRAN planned mode. A D2D DRB for data downloading/uploading service may be established based on the UE autonomous mode. Semi-persistent scheduling (SPS) transmissions over the D2D connection may be configured by the serving eNB in the E-UTRAN Planned Mode. Which mode between the UE autonomous and E-UTRAN planned mode is used for the D2D connection may decided by the serving eNB. When the M-UE makes a D2D connection with the S-UE, the M-UE may transmit information about this D2D connection establishment to the serving eNB. Upon receiving the information from the M-UE, the serving eNB ma inform the M-UE which mode should be configured for this D2D connection among the UE autonomous, the E-UTRAN planned, and the hybrid mode.

Hereinafter, it is assumed that the serving eNB is an eNB serving the M-UE. If the eNB serves the S-UE, but it does not serve the M-UE, the eNB is clearly written as 'S-UE serving eNB' hereinafter. When the S-UE serving eNB is used to express a certain procedure, 'M-UE serving eNB' may be also used.

Followings are identities used for the D2D connection.
    M-CRNTI: cell radio network temporary identity (C-RNTI) allocated for the M-UE
    S-CRNTI: C-RNTI allocated for the S-UE
    S-UE identity: The S-UE identity may correspond to one of an international mobile subscriber identity (IMSI), a system architecture evolution (SAE) temporary mobile subscriber identity (S-TMSI), an S-CRNTI, and a new UE identity allocated to the S-UE. The S-UE identity may be allocated by the M-UE, the M-UE serving eNB, the S-UE serving eNB, or an EPC node such as MME/home location register (HLR).

Followings are channels used for the D2D connection.

D2D downlink: a direction from the M-UE to the S-UE

D2D uplink: a direction from the S-UE to the M-UE

D-BCCH: D2D downlink broadcast control channel used over the D2D connection. The M-UE broadcasts the D-BCCH to one or more S-UEs, e.g. for delivery of D2D system information or helping an S-UE detect another UE for the D2D connection.

D-RACH: D2D uplink random access channel used over the D2D connection. The M-UE may allocate radio resources for the D-RACH. The S-UE may know configuration of the D-RACH by receiving information on the D-BCCH. The S-UE may transmit a preamble or message over the D-RACH to the M-UE, in order to make a connection with the M-UE or in order to transmit data to the M-UE.

D-CCCH: D2D uplink/downlink common control channel used over the D2D connection.

D-DCCH: D2D uplink/downlink dedicated control channel used over the D2D connection.

D2D RB: radio bearer which is established over the D2D connection between the M-UE and the S-UE. A DRB and a SRB may be provided for D2D user data and D2D control info, respectively.

Figure 8:
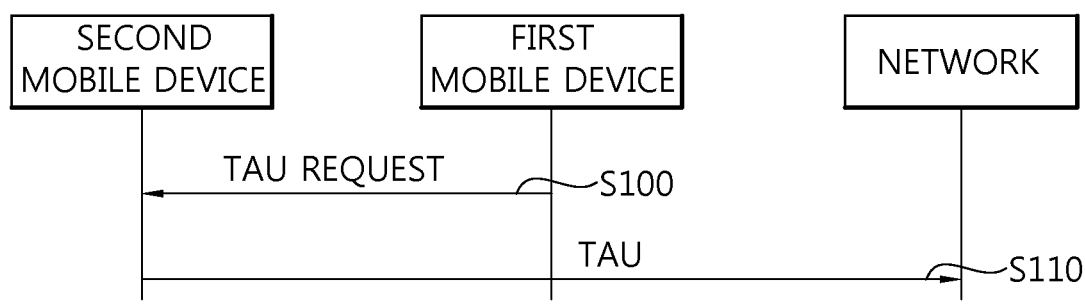
FIG. 8 shows an example of a method for updating a tracking area for D2D connection according to an embodiment of the present invention.

FIG. 8 shows an example of a method for updating a tracking area for D2D connection according to an embodiment of the present invention.

At step S100, the M-UE transmits a TAU request message to the S-UE. The M-UE may transmit the TAU request message due to TAU of the M-UE. The TAU request message may include a tracking area code and an identity of the M-UE.

At step S110, the S-UE transmits a TAU message to a network. The TAU message may include an identity of the M-UE and a D2D connection indication which informs the network that the S-UE is connected to the network via the D2D connection. In addition, the TAU message may include information on the S-UE, e.g. an identity of the S-UE. The TAU message may be transmitted to an MME via the M-UE and the serving eNB, or may be transmitted to the serving eNB directly.

Figure 9:
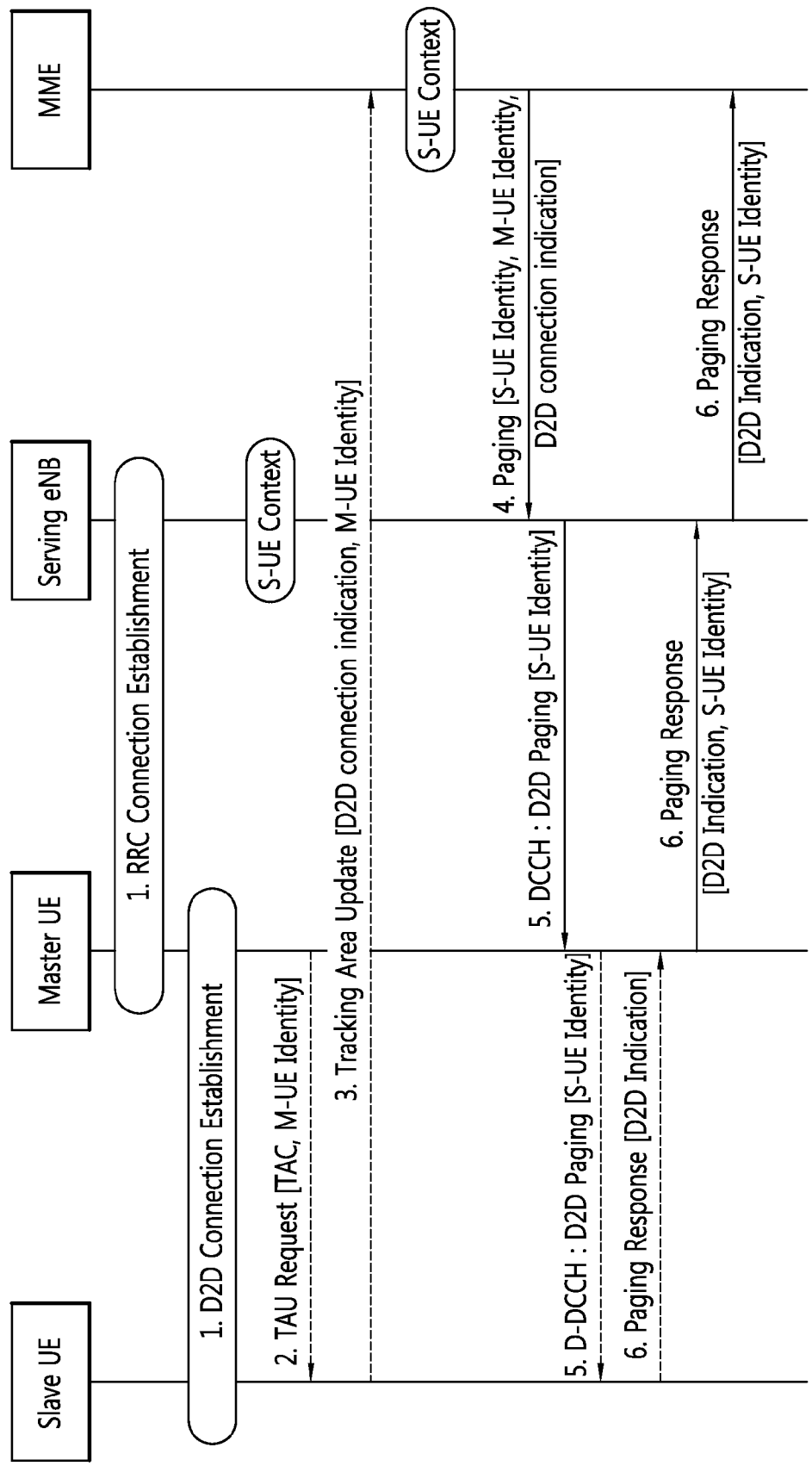
FIG. 9 shows an example of a method for updating a tracking area for D2D connection and a method for paging for D2D connection in an E-UTRAN planned mode according to an embodiment of the present invention.

FIG. 9 shows an example of a method for updating a tracking area for D2D connection and a method for paging for D2D connection in an E-UTRAN planned mode according to an embodiment of the present invention.

1. It is assumed that the M-UE and the serving eNB are connected by an RRC connection. If the S-UE is connected to the M-UE, the S-UE may receive a paging via the M-UE connected to the serving eNB. It is assumed that S-UE context is established in the serving eNB and the MME for this paging procedure.

2. When tracking area update (TAU) is needed, e.g. due to TAU of the M-UE, and if D2D connection is in the E-UTRAN planned mode, the M-UE may request the S-UE to perform TAU by transmitting a TAU request message including a tracking area code (TAC) and an M-UE identity to the S-UE.

3. When TAU is needed, e.g. upon reception of the TAU request message from the M-UE, the S-UE may transmit a TAU message to the MME via the M-UE and the serving eNB. The TAU message may contain the M-UE identity and a D2D connection indication that is used to inform the MME that the S-UE is connected to the MME via D2D connection.

Alternatively, the S-UE may transmit the TAU message directly to the serving eNB, independently from D2D connection. Or, when the M-UE transmits the TAU message to the MME, the M-UE includes information on the S-UE such as an S-UE identity in the TAU message. In this case, one TAU procedure is used for tracking area update of both the M-UE and the S-UE.

4. When the MME pages the S-UE, e.g. due to data arrival, the MME transmits a paging message including an S-UE identity, the M-UE identity and the D2D connection indication to eNBs. In this case for paging the S-UE, the MME may transmit this paging message to eNBs belonging to the tracking area of the M-UE, based on the received M-UE identity.

5. If the S-UE is connected to the M-UE via D2D connection, the serving eNB transmits a D2D paging message to the S-UE via the M-UE on a DCCH and a D-DCCH. The D2D paging message may include the S-UE identity.

6. In response to the paging message, the S-UE transmits a paging response message to the MME via the M-UE and the serving eNB. The D2D indication and the S-UE identity may be included in the paging response message. The D2D indication informs the MME that the S-UE is still connected via D2D connection.

Figure 10:
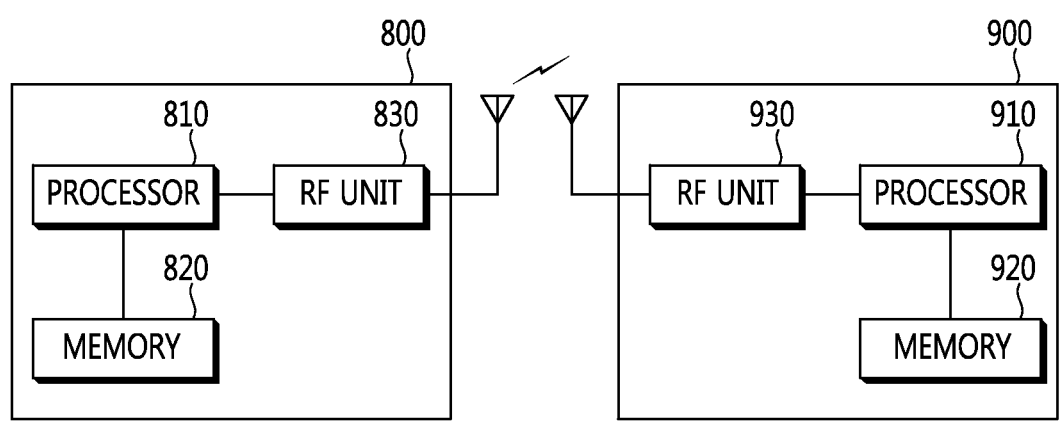
FIG. 10 is a block diagram showing wireless communication system to implement an embodiment of the present invention.

FIG. 10 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for updating, by a second mobile device, a tracking area for a device-to-device (D2D) connection in a wireless communication system, the method comprising:
receiving a tracking area update (TAU) request message from a first mobile device which has a D2D connection with the second mobile device; and
transmitting a TAU message to a network;
receiving a D2D paging message from the network; and
transmitting a paging response message to the network,
wherein the paging response message includes an identity of the second mobile device and a D2D connection indication which informs the network that the second mobile device is connected to the network via the D2D connection.

2. The method of claim 1, wherein the TAU request message includes a tracking area code and an identity of the first mobile device.

3. The method of claim 1, wherein the TAU message includes an identity of the first mobile device and the D2D connection indication which informs the network that the second mobile device is connected to the network via the D2D connection.

4. The method of claim 1, wherein the TAU message includes information on the second mobile device.

5. The method of claim 4, wherein the information on the second mobile device is an identity of the second mobile device.

6. The method of claim 1, wherein the TAU message is transmitted to a mobility management entity (MME) via the first mobile device and a serving eNodeB (eNB).

7. The method of claim 1, wherein the TAU message is transmitted to a serving eNB directly.

8. A method for updating, by a first mobile device, a tracking area for a device-to-device (D2D) connection in a wireless communication system, the method comprising:
transmitting a tracking area update (TAU) request message, to a second mobile device which has a D2D connection with the first mobile device, due to TAU of the first mobile device;
receiving a paging response message from the second mobile device; and
transmitting the paging response message to a network,
wherein the paging response message includes an identity of the second mobile device and a D2D connection indication which informs the network that the second mobile device is connected to the network via the D2D connection.

9. The method of claim 8, wherein the TAU request message includes a tracking area code and an identity of the first mobile device.

10. The method of claim 8, further comprising:
receiving a D2D paging message from a network; and
transmitting the D2D paging message to the second mobile device.

11. The method of claim 10, wherein the D2D paging message includes the identity of the second mobile device.

* * * * *